US011962971B2

(12) United States Patent
Ogura

(10) Patent No.: US 11,962,971 B2
(45) Date of Patent: Apr. 16, 2024

(54) ACOUSTIC LENS AND SPEAKER SYSTEM

(71) Applicant: Panasonic Intellectual Property Management Co., Ltd., Osaka (JP)

(72) Inventor: Takashi Ogura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 17/639,484

(22) PCT Filed: Jul. 1, 2020

(86) PCT No.: PCT/JP2020/025791
§ 371 (c)(1),
(2) Date: Mar. 1, 2022

(87) PCT Pub. No.: WO2021/049136
PCT Pub. Date: Mar. 18, 2021

(65) Prior Publication Data

US 2022/0321995 A1 Oct. 6, 2022

(30) Foreign Application Priority Data

Sep. 13, 2019 (JP) ................................ 2019-167017

(51) Int. Cl.
*H04R 1/34* (2006.01)

(52) U.S. Cl.
CPC ................................... *H04R 1/345* (2013.01)

(58) Field of Classification Search
CPC ................................. H04R 1/02; H04R 1/345
See application file for complete search history.

(56) References Cited

U.S. PATENT DOCUMENTS 4,870,691 A 9/1989 Mindel
5,117,462 A * 5/1992 Bie ......................... H04R 1/30 181/185
5,117,463 A 5/1992 Oyaba et al.
(Continued)

FOREIGN PATENT DOCUMENTS

JP 59014484 U * 1/1984
JP S59-014484 U 1/1984
(Continued)

OTHER PUBLICATIONS

International Search Report dated Sep. 24, 2020 in International Patent Application No. PCT/JP2020/025791, with English translation.

*Primary Examiner* — Sunita Joshi
(74) *Attorney, Agent, or Firm* — Rimon P.C.

(57) ABSTRACT

An acoustic lens includes: a plurality of fins each having one end portion located on a side opposite to the loudspeaker on a support surface that extends as convexly curved along a predetermined direction when the acoustic lens is viewed from a lateral side, the plurality of fins being arranged in the predetermined direction at substantially equal intervals and substantially in parallel to one another. When the acoustic lens is viewed from the lateral side, the plurality of fins are substantially identical in length, and an elevation angle of the support surface relative to each of the plurality of fins gradually increases from one side to an other side in the predetermined direction.

15 Claims, 14 Drawing Sheets

(56) References Cited

U.S. PATENT DOCUMENTS

| | | | |
|---|---|---|---|
| 5,274,709 | A | 12/1993 | Koizumi |
| 2007/0064958 | A1 | 3/2007 | Nakamura |

FOREIGN PATENT DOCUMENTS

| | | | |
|---|---|---|---|
| JP | S59-132285 | U | 9/1984 |
| JP | 64-30399 | A | 2/1989 |
| JP | 06-035489 | A | 2/1994 |
| WO | 2005/015947 | A1 | 2/2005 |

* cited by examiner

Horizontal characteristics

| | 2 kHz - 20 kHz | | 10 kHz - 20 kHz | |
|---|---|---|---|---|
| | 30° | 60° | 30° | 60° |
| Comparison example (acoustic lens is absent) | -1.2 dB | -5.5 dB | -2.2 dB | -6.9 dB |
| Working example (acoustic lens is present) | 2.8 dB | -1.7 dB | 6.3 dB | 1.2 dB |

Vertical characteristics

| | 2 kHz - 20 kHz | | 10 kHz - 20 kHz | |
|---|---|---|---|---|
| | 30° | 60° | 30° | 60° |
| Comparison 1 (acoustic lens is absent) | -0.3 dB | -6.0 dB | -1.0 dB | -5.5 dB |
| Comparison 2 (acoustic lens is present) | 2.5 dB | -1.5 dB | 2.4 dB | 0.8 dB |
| Working example (acoustic lens is present) | 2.3 dB | -0.2 dB | 5.0 dB | 5.2 dB |

ACOUSTIC LENS AND SPEAKER SYSTEM

CROSS-REFERENCE OF RELATED APPLICATIONS

This application is the U.S. National Phase under 35 U.S.C. § 371 of International Patent Application No. PCT/JP2020/025791, filed on Jul. 1, 2020, which in turn claims the benefit of Japanese Application No. 2019-167017, filed on Sep. 13, 2019, the entire disclosures of which applications are incorporated by reference herein.

TECHNICAL FIELD

The present disclosure relates to an acoustic lens and a speaker system including the acoustic lens.

BACKGROUND ART

Acoustic lenses attached to loudspeakers are known (see, for example, Patent Literature [PTL] 1). A conventional acoustic lens has a plurality of fins arranged in parallel to each other. A notch having a wedge shape is defined at the center portion of each of the plurality of fins in the width direction. The plurality of fins are each disposed at an angle to the central axis of a diaphragm of a loudspeaker. A sound path is defined between adjacent ones of the plurality of fins to guide sound waves emitted from the diaphragm to the outside of the acoustic lens.

With the acoustic lens described above, the sound path at an end portion of the fin in the width direction is longer than the sound path at the center portion of the fin in the width direction (i.e., the portion at which the notch is defined). For that reason, the sound waves that pass through the sound path at the end portion of the fin in the width direction come out of the acoustic lens seemingly later than the sound waves that pass through the sound path at the center portion of the fin in the width direction. As a result, the wavefront of the sound waves from the acoustic lens travels as curved in the horizontal direction (in the direction of the width of the fin).

As a result, high frequency sound waves with high rectilinearity from a loudspeaker such as a tweeter, for example, are expanded in the horizontal direction by the acoustic lens described above, and thus it is possible to expand the directional characteristics of the loudspeaker in the horizontal direction.

CITATION LIST

Patent Literature

[PTL 1] Japanese Unexamined Utility Model (Registration) Application Publication No. 59-14484

SUMMARY OF INVENTION

Technical Problem

The present disclosure provides an acoustic lens capable of effectively improving the directional characteristics of a loudspeaker, and a speaker system including the acoustic lens.

Solution to Problem

An acoustic lens according to the present disclosure is an acoustic lens that is attached to a loudspeaker. The acoustic lens includes: a plurality of fins each having one end portion located on a side opposite to the loudspeaker on a curved line that extends as convexly curved along a predetermined direction when the acoustic lens is viewed from a lateral side, the plurality of fins being arranged in the predetermined direction at substantially equal intervals and substantially in parallel to one another. In the acoustic lens, when the acoustic lens is viewed from the lateral side, the plurality of fins are substantially identical in length, and an elevation angle of the curved line relative to each of the plurality of fins gradually increases from one side to an other side in the predetermined direction.

Advantageous Effects of Invention

With the acoustic lens according to the present disclosure, it is possible to effectively improve the directional characteristics of a loudspeaker.

DESCRIPTION OF EMBODIMENTS

Hereinafter, non-limiting embodiments are described in greater detail with reference to the accompanying Drawings. However, there are instances where description that is too detailed is omitted. For example, there are instances where detailed description of well-known matter and redundant description of substantially identical components are omitted. This is for the purpose of preventing the following description from being unnecessarily redundant, and facilitating understanding of those skilled in the art.

It should be noted that the accompanying Drawings and subsequent description are provided by the inventors to allow a person of ordinary skill in the art to sufficiently understand the present disclosure, and are thus not intended to limit the scope of the subject matter recited in the Claims.

Embodiment

Hereinafter, certain exemplary embodiments are described with reference to FIG. 1 to FIG. 16. In FIG. 1 to FIG. 6, the depth direction of fin 18 (which will be described later) of acoustic lens 6 is referred to as an X-axis direction, the width direction of fin 18 is referred to as a Y-axis direction, and the thickness direction of fin 18 is referred to as a Z-axis direction.

1. Configuration of Speaker System

Figure 1:
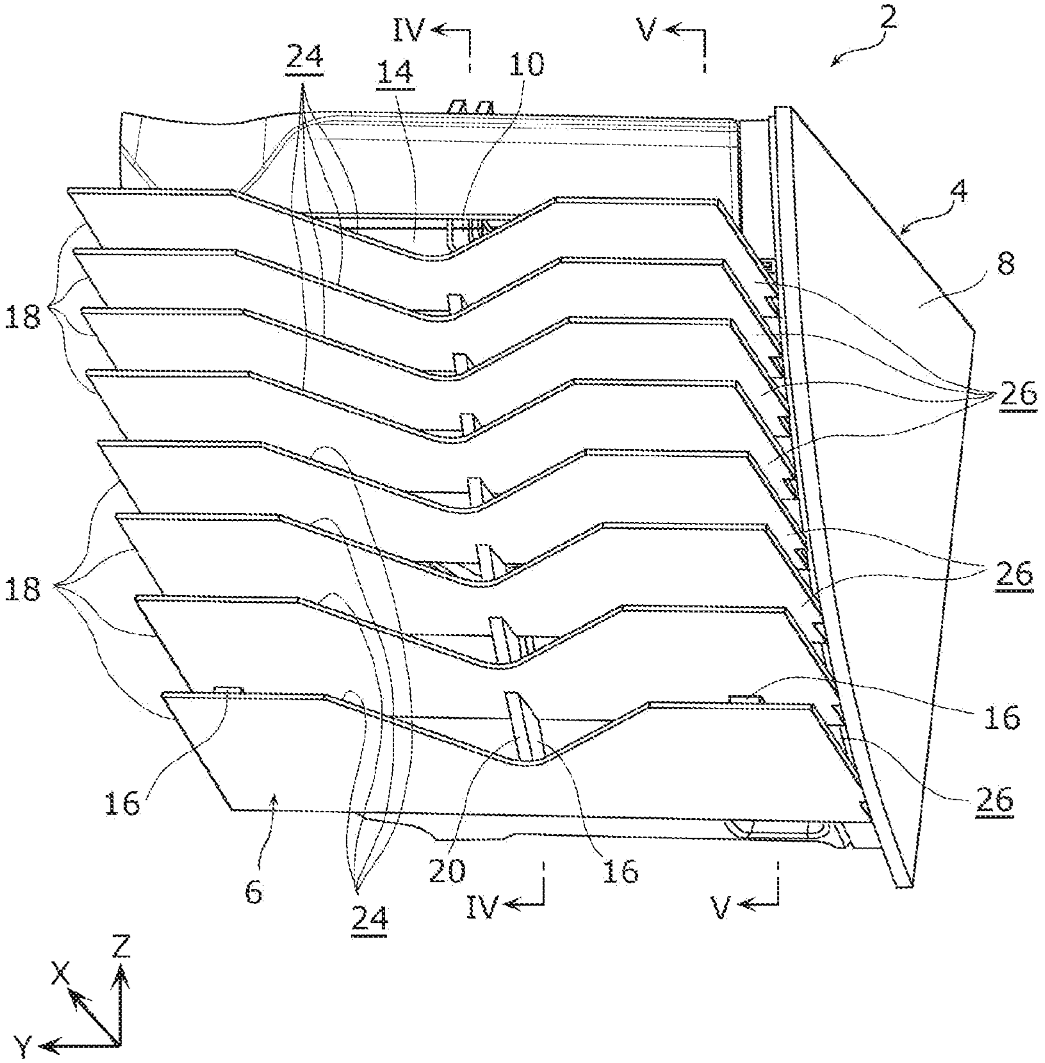
FIG. 1 is a perspective view illustrating a speaker system according to an embodiment.
Figure 2:
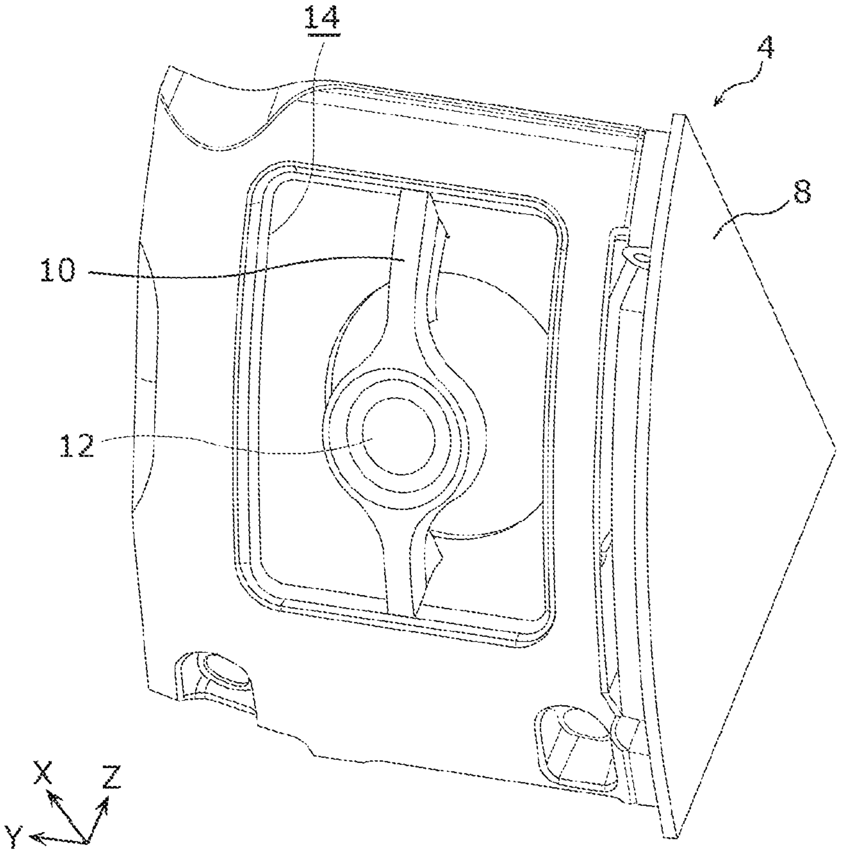
FIG. 2 is a perspective view illustrating a loudspeaker according to the embodiment, with an acoustic lens being detached.

First, a configuration of speaker system 2 according to an embodiment will be described with reference to FIG. 1 and FIG. 2. FIG. 1 is a perspective view illustrating speaker system 2 according to the embodiment. FIG. 2 is a perspective view illustrating loudspeaker 4 according to the embodiment, with acoustic lens 6 being detached.

As illustrated in FIG. 1, speaker system 2 includes loudspeaker 4, and acoustic lens 6 attached to loudspeaker 4.

Loudspeaker 4 is a loudspeaker for high-pitched sounds, such as a tweeter that outputs high frequency sounds, for example. As illustrated in FIG. 2, loudspeaker 4 includes cabinet 8, stay 10, and diaphragm 12. Opening 14 having a substantially quadrilateral shape is provided in the front surface of cabinet 8. It should be noted that the front surface of cabinet 8 is convexly curved along a predetermined direction (up and down direction in the diagram in FIG. 2) on the opposite side of loudspeaker 4. Stay 10 is supported by opening 14 of cabinet 8. Diaphragm 12 is formed in a circular shape and is supported by stay 10.

As illustrated in FIG. 1, acoustic lens 6 is attached to the front surface of cabinet 8 of loudspeaker 4 and is positioned to face diaphragm 12 of loudspeaker 4. The configuration of acoustic lens 6 will be described later.

2. Configuration of Acoustic Lens

Figure 3:
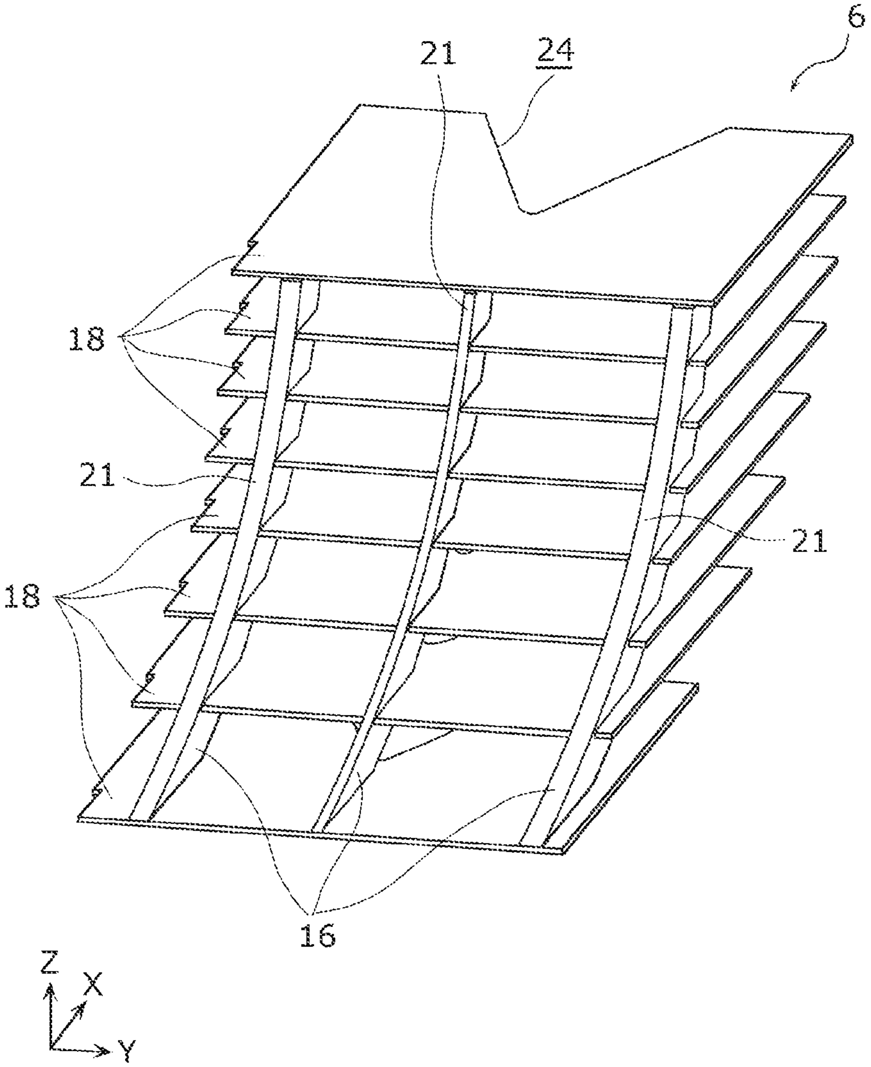
FIG. 3 is a perspective view illustrating the acoustic lens according to the embodiment, as viewed from an angle different from that of FIG. 1.
Figure 4:
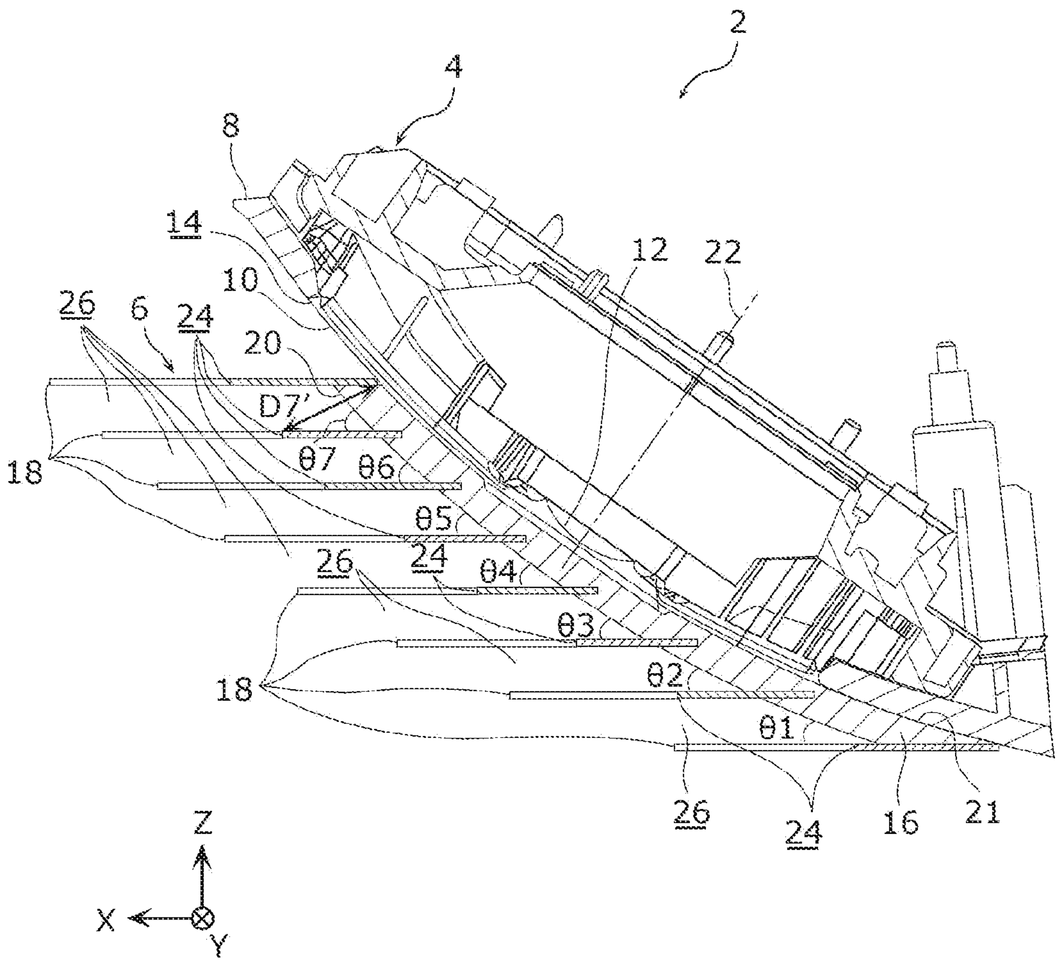
FIG. 4 is a cross-sectional view of the speaker system according to the embodiment, taken along the line IV-IV of FIG. 1.
Figure 5:
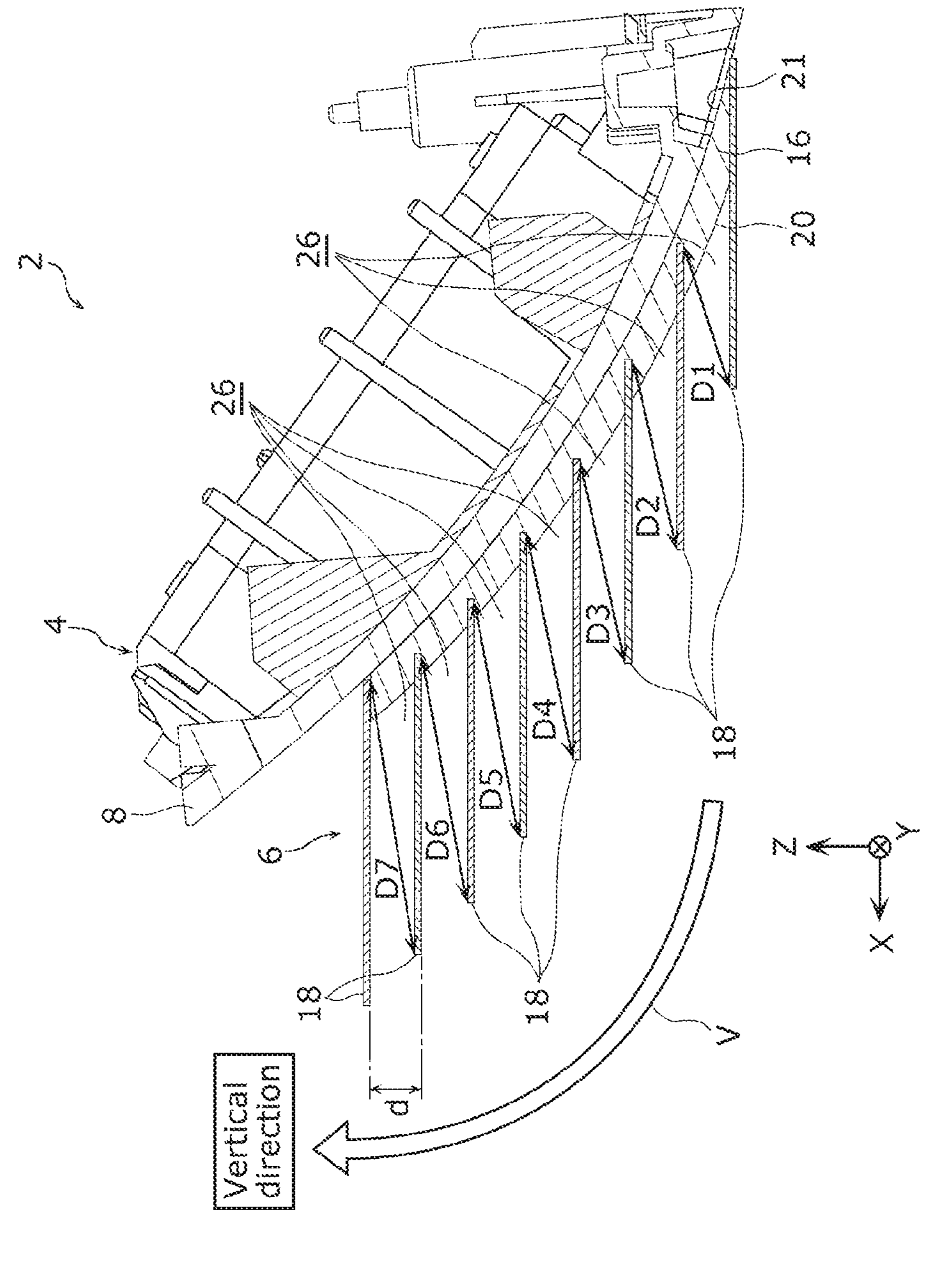
FIG. 5 is a cross-sectional view of the speaker system according to the embodiment, taken along the line V-V of FIG. 1.

Next, a configuration of acoustic lens 6 will be described with reference to FIG. 1 and FIG. 3 to FIG. 5. FIG. 3 is a perspective view illustrating acoustic lens 6 according to the embodiment, as viewed from an angle different from that of FIG. 1. FIG. 4 is a cross-sectional view of speaker system 2 according to the embodiment, taken along the line IV-IV of FIG. 1. FIG. 5 is a cross-sectional view of speaker system 2 according to the embodiment, taken along the line V-V of FIG. 1.

As illustrated in FIG. 1 and FIG. 3, acoustic lens 6 includes three bases 16 and eight fins 18. In FIG. 4, the eight fins 18 are composed of a first fin, a second fin, . . . , and an eighth fin, in order from fin 18 located at the lowest position. It should be noted that the total number of bases 16 and the total number of fins 18 may be changed as appropriate, depending on the degree of effect or the form of installation.

As illustrated in FIG. 1, FIG. 4, and FIG. 5, eight fins 18 are arranged at predetermined angles and intervals on first surface 20 of each base 16 having a curved shape. On the other hand, second surface 21 of each base 16 is mounted on cabinet 8 so as to follow the curved surface. As described above, second surface 21 of each base 16 is curved in a shape that follows the curved surface of cabinet 8, and first surface 20 of each base 16 is also curved to correspond to the shape of second surface 21. However, the curvature of first surface 20 and the curvature of second surface 21 of each base 16 need not necessarily be the same.

Eight fins 18 are supported on first surface 20 of each base 16. Hereinafter, first surface 20 is also referred to as the "support surface 20". In addition, as illustrated in FIG. 3, each base 16 extends, on a side opposite to loudspeaker 4, as convexly curved along a predetermined direction (up and down direction in the diagrams in FIG. 1 and FIG. 3) to correspond to the shape of the front surface of cabinet 8 of loudspeaker 4. As a result, support surface 20 of each base 16 is defined by a curved surface that extends as convexly curved along the above-described predetermined direction on the side opposite to loudspeaker 4. In other words, when acoustic lens 6 is viewed from the XZ side, support surface 20 of each base 16 defines a curved line that extends as convexly curved along the above-described predetermined direction on the side opposite to loudspeaker 4. As illustrated in FIG. 1, each base 16 is attached to the front surface of cabinet 8 of loudspeaker 4 and is spaced apart in the width direction (Y-axis direction) of fins 18. It should be noted that support surface 20 of each base 16 is arranged to face the side opposite to cabinet 8 of loudspeaker 4.

As illustrated in FIG. 1, fins 18 are each formed to have a substantially quadrilateral thin plate shape and is supported on support surface 20 of each base 16. In other words, one end portion of each fin 18 in the depth direction is supported by support surface 20. Here, as illustrated in FIG. 4 and FIG. 5, one end portion of each fin 18 in the depth direction is actually supported in such a manner that the one end portion is fitted into a groove defined on support surface 20. However, in this Specification, it is assumed that the one end portion of each fin 18 in the depth direction is located on support surface 20 (i.e., on a curved line that extends as convexly curved along the above-described predetermined direction on the side opposite to loudspeaker 4). Each fin 18 extends from support surface 20 of each base 16 to the side opposite to loudspeaker 4 (in the depth direction).

The size of each fin 18 is substantially identical. In other words, the size of each fin 18 in the width direction (Y-axis direction) (120 mm in the embodiment), the size of each fin 18 in the depth direction (X-axis direction) (50 mm in the embodiment), and the size of each fin 18 in the thickness direction (Z-axis direction) (1 mm in the embodiment) are substantially identical. Here, the size of each fin 18 in the depth direction means the length of each fin 18 when acoustic lens 6 is viewed from the XZ side. It should be noted that the term "substantially identical" means not only completely identical, but also identical in a substantial manner, i.e., including differences in size of a few percent, for example. This is also true for other expressions of "substantially identical".

It should be noted that, according to the present embodiment, fins 18 are each supported on support surface 20 of each base 16. However, the configuration for supporting each of fins 18 is not limited to the above configuration as long as the positional relationship of the plurality of fins 18 is the same. For example, fins 18 each may be supported by a linearly extending stick-like component as a result of the stick-like component passing through the center portion of each of fins 18 in the depth direction.

In addition, although fins 18 are assumed to be substantially identical in size according to the present embodiment, the present disclosure is not limited to this case. As long as fins 18 are substantially identical in size in the depth direction, fins 18 may be different from one another in other dimensions and shapes. For example, fins 18 may be different from one another in size in the width direction.

As illustrated in FIG. 4 and FIG. 5, fins 18 are respectively arranged along a predetermined direction (along support surface 20 of the respective bases 16) at substantially equal intervals and substantially in parallel to one another. It should be noted that the expression "substantially in parallel" means not only completely parallel, but also parallel in a substantial manner, i.e., including differences of a few percent, for example. As illustrated in FIG. 5, arrangement interval d (7 mm in the present embodiment) of each fin 18 in the above-described predetermined direction is substantially the same. In addition, as illustrated in FIG. 4, fins 18 are each disposed to be inclined at a predetermined angle (e.g., 55 degrees) to central axis 22 of diaphragm 12 of loudspeaker 4. It should be noted that central axis 22 of diaphragm 12 is a straight line that passes through the center of the diameter of diaphragm 12 and extends substantially perpendicularly to the surface of diaphragm 12.

As illustrated in FIG. 1, notch 24 having a wedge shape is defined at the other end portion of each fin 18 in the depth direction (i.e., the end portion located opposite to support surface 20). Notch 24 is located at the center portion of fin 18 in the width direction. According to the present embodiment, the size of notch 24 in the width direction is 60 mm±a few mm, and the size of notch 24 in the depth direction is 40 mm±a few mm.

As illustrated in FIG. 4, when acoustic lens 6 is viewed from the XZ side, the elevation angle of support surface 20 relative to each fin 18 gradually increases from one side to the other side in the above-described predetermined direction (i.e., from the bottom to the top in the diagram in FIG. 4). More specifically, when the elevation angles of support surfaces 20 to the respective fins 18 are denoted as θ1, θ2, θ3, θ4, θ5, θ6, and θ7 (i.e., θ1 to θ7) in the order from one side to the other side in the above-described predetermined direction (i.e., in the order from fin 18 located at the lowest position (the first fin) to fin 18 located at the highest position (the eighth fin) in FIG. 4), the relationship θ1<θ2<θ3<θ4<θ5<θ6<θ7 is established. Here, elevation angles θ1 to θ7 of support surfaces 20 relative to fins 18 each mean the angle between fin 18 and the tangent line at the intersection of fin 18 and support surface 20 when acoustic lens 6 is viewed from the XZ side.

It should be noted that the smallest elevation angle θ1 among elevation angles θ1 to θ7 is greater than 0 degrees and less than or equal to 30 degrees. When the smallest elevation angle θ1 is greater than 30 degrees, it becomes difficult to bend the directional characteristics of loudspeaker 4 toward the vertical direction, as described below. In addition, as illustrated in FIG. 4, when acoustic lens 6 is viewed from the XZ side, the line connecting one end portion of each fin 18 in the depth direction (i.e., the end portion on the support surface 20 side) is a curved line corresponding to the shape of support surface 20 of base 16.

As illustrated in FIG. 4, sound path 26 is defined between adjacent ones of fins 18 of the eight fins 18 to guide the sound waves emitted from diaphragm 12 of loudspeaker 4 to the outside of acoustic lens 6. As illustrated in FIG. 5, a sound path distance which is the length of the path of the sound waves emitted from diaphragm 12 of loudspeaker 4 in sound path 26 increases gradually from one side to the other side in the above-described predetermined direction. More specifically, when the sound path distances are respectively denoted as D1, D2, D3, D4, D5, D6, and D7 in the order from one side to the other side in the above-described predetermined direction (i.e., in the order from fin 18 located at the lowest position to fin 18 located at the highest position in FIG. 5), the relationship D1<D2<D3<D4<D5<D6<D7 is established. The relationship of the sound path distance can be established at any position in the width direction of each fin 18. As illustrated in FIG. 5, according to the present embodiment, sound path distances D1, D2, D3, D4, D5, D6, and D7 at the end portion (i.e., the portion where notch 24 is not defined) in the width direction of each fin 18 are 2.6 cm, 3.4 cm, 3.6 cm, 4.0 cm, 4.1 cm, 4.3 cm, and 4.5 cm, respectively.

In addition, In each sound path 26, the sound path distance is the shortest at the center portion of fin 18 in the width direction (i.e., the portion where notch 24 is defined), and the sound path distance is the longest at both end portions of fin 18 in the width direction (i.e., the portion where notch 24 is not defined). When the ratio (D7/D7', for example) of the shortest sound path distance (D7' in FIG. 4, for example) to the longest sound path distance (D7 in FIG. 5, for example) is a refractive index, it is desirable that the refractive index be approximately constant in any sound path 26. For that reason, according to the present embodiment, the size of notch 24 of each fin 18 is set such that the refractive index is approximately constant in any sound path 26. It should be noted that the phrase "approximately constant" means not only completely constant, but also constant in a substantial manner, i.e., including differences of a few percent, for example. In addition, notches 24 of fins 18 may be different from one another in size or may be substantially identical in size, as long as the condition that the refractive index is approximately constant in any of sound paths 26 is satisfied.

3. Function of Acoustic Lens

Figure 6:
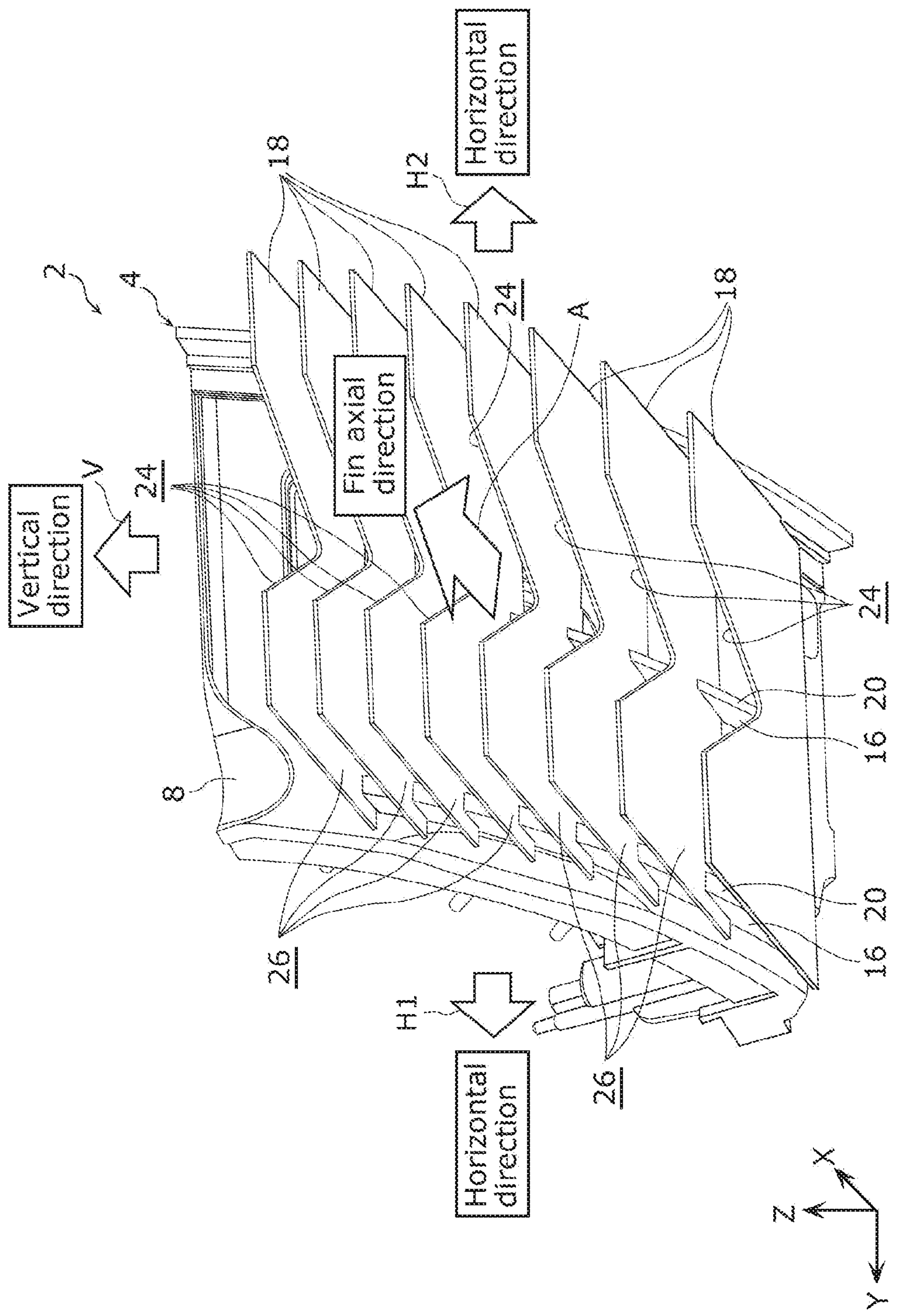
FIG. 6 is a diagram for explaining the function of the acoustic lens according to the embodiment.

Next, a function of acoustic lens 6 will be described with reference to FIG. 5 and FIG. 6. FIG. 6 is a diagram for explaining the function of acoustic lens 6 according to the embodiment.

Acoustic lens 6 has the function of expanding the directional characteristics of loudspeaker 4 in the horizontal direction (i.e., in the Y-axis direction) and the function of bending the directional characteristics of loudspeaker 4 toward the vertical direction (i.e., to the positive side of the Z-axis). The function of bending the directional characteristics of loudspeaker 4 toward the vertical direction is to bend the sound waves in the direction where the elevation angle of fin 18 relative to the plane of diaphragm 12 of loudspeaker 4 is large, and to expand the listening area in that direction. Here, the phrase "to bend the sound waves in the direction where the elevation angle of fin 18 is large" means to change the direction in which the sound waves mainly reach (i.e., the direction in which the sound pressure is highest) with respect to the orientation of loudspeaker 4 (i.e., the direction of central axis 22 of diaphragm 12). In addition, "to expand the listening area in that direction" means that the sound pressure further increases in that direction.

The sound waves emitted from diaphragm 12 of loudspeaker 4 (see FIG. 4) pass through sound path 26 between adjacent ones of fins 18, thereby being guided to the outside of acoustic lens 6. As indicated by the arrow denoted as A in FIG. 6, the sound waves that have passed through sound path 26 in the center portion of fin 18 in the width direction (i.e., the portion where notch 24 is defined) will travel straight in a fin axial direction (i.e., to the positive side of the X-axis) that is the direction substantially parallel to the depth direction of fin 18.

In addition, as described above, notch 24 having a wedge shape is defined at the other end portion of each fin 18 in the depth direction. According to this configuration, in each sound path 26, the sound path distance (for example, D7 in FIG. 5) at both end portions (the portions where notch 24 is not defined) of fin 18 in the width direction is longer than the sound path distance (for example, D7' in FIG. 4) at the center portion (the portion where notch 24 is defined) of fin 18 in the width direction. For that reason, the sound waves that pass through sound path 26 at the both end portions of fin 18 in the width direction come out of acoustic lens 6 seemingly later than the sound waves that pass through sound path 26 at the center portion of fin 18 in the width direction. Accordingly, the wavefront of the sound waves from acoustic lens 6 travels as curved in the horizontal direction (i.e., the positive side and negative side in the Y-axis direction). As a result, as indicated by the arrows denoted as H1 and H2 in FIG. 6, the sound waves emitted from diaphragm 12 of loudspeaker 4 are diffracted by acoustic lens 6 while expanding in the horizontal direction which is the direction in which the sound path distance increases, and thus it is possible to expand the directional characteristics of loudspeaker 4 in the horizontal direction. Hereinafter, the directional characteristics of loudspeaker 4 in the horizontal direction are referred to as "horizontal characteristics".

In addition, as described above, support surface 20 of each base 16 extends as convexly curved along the above-described predetermined direction on the opposite side of loudspeaker 4, and thus the elevation angle of support surface 20 relative to each fin 18 gradually increases from one side to the other side in the above-described predetermined direction when acoustic lens 6 is viewed from the XZ side. This causes the sound path distance in each sound path 26 to gradually increase from one side to the other side in the above-described predetermined direction. For that reason, the sound waves that pass through sound path 26 between adjacent ones of fins 18 located uppermost in FIG. 5 come out of acoustic lens 6 seemingly later than the sound waves that pass through sound path 26 between adjacent ones of fins 18 located lowermost in FIG. 5. In this manner, the wavefront of the sound waves from acoustic lens 6 travels as curved toward the vertical direction (i.e., toward the positive side in the Z-axis direction). As a result, as indicated by the arrow denoted as V in FIG. 5 and FIG. 6, the sound waves emitted from diaphragm 12 of loudspeaker 4 are diffracted by acoustic lens 6 while expanding toward the vertical direction which is the direction in which the sound path distance increases, and thus it is possible to bend the directional characteristics of loudspeaker 4 toward the vertical direction. Hereinafter, the directional characteristics of loudspeaker 4 toward the vertical direction are referred to as "vertical characteristics".

As described above, acoustic lens 6 according to the present embodiment is capable of expanding high frequency sound waves with high directivity from loudspeaker 4 not only in the horizontal direction but also toward the vertical direction. As a result, it is possible to expand the directional characteristics of loudspeaker 4 in the horizontal direction and also to bend the directional characteristics of loudspeaker 4 toward the vertical direction. According to this configuration, for example, by causing a sound of birdcalls, etc. from loudspeaker 4 to bend toward the vertical direction (vertically upward direction) to be reflected at the ceiling of the room, it is possible to reproduce a three-dimensional sound as if the sound of birdcalls were coming from the air in the room.

4. Advantageous Effects

As described above, according to the present embodiment, acoustic lens 6 is an acoustic lens that is attached to loudspeaker 4. Acoustic lens 6 includes: a plurality of fins 18 each having one end portion located on a side opposite to loudspeaker 4 on a curved line that extends as convexly curved along a predetermined direction when acoustic lens 6 is viewed from the XZ side, the plurality of fins 18 being arranged in the predetermined direction at substantially equal intervals and substantially in parallel to one another. When acoustic lens 6 is viewed from the XZ side, the plurality of fins 18 are substantially identical in length, and an elevation angle of the curved line relative to each of the plurality of fins 18 gradually increases from one side to an other side in the predetermined direction.

According to this configuration, since one end portion of each fin 18 is located on a side opposite to loudspeaker 4 on a curved line that extends as convexly curved along a predetermined direction, an elevation angle of the curved line relative to each of the plurality of fins 18 gradually increases from one side to an other side in the above-described predetermined direction when acoustic lens 6 is viewed from the XZ side. This causes a sound path distance to gradually increase from one side to the other side in the above-described predetermined direction. As a result, the sound waves emitted from loudspeaker 4 are bent toward the vertical direction by acoustic lens 6, and thus it is possible to bend the directional characteristics of loudspeaker 4 toward the vertical direction.

In addition, according to the present embodiment, acoustic lens 6 further includes base 16 including support surface 20 that defines the curved line when acoustic lens 6 is viewed from the XZ side. The one end portion of each of the plurality of fins 18 is supported by support surface 20 of base 16.

According to this configuration, it is possible to cause the plurality of fins 18 to be supported by support surface 20 of base 16 such that one end portion of each of the plurality of fins 18 is located on the side opposite to loudspeaker 4 on the curved line that extends as convexly curved along the predetermined direction.

In addition, according to the present embodiment, the plurality of fins 18 include n fins from a first fin to an n-th fin, n being an integer greater than or equal to 2. When acoustic lens 6 is viewed from the XZ side, a relationship of $\theta 1 < \ldots < \theta n$ is established, θ1 denoting an elevation angle of support surface 20 relative to the first fin, θn denoting an elevation angle of support surface 20 relative to the n-th fin.

According to this configuration, the sound waves emitted from loudspeaker 4 are bent toward the vertical direction by acoustic lens 6, and thus it is possible to bend the directional characteristics of loudspeaker 4 toward the vertical direction.

In addition, according to the present embodiment, the elevation angle denoted as θ1 is greater than 0 degrees and less than or equal to 30 degrees.

According to this configuration, it is possible to effectively bend the sound waves toward the vertical direction by acoustic lens 6.

In addition, according to the present embodiment, the plurality of fins 18 are substantially identical in size.

According to this configuration, it is possible to efficiently increase the sound path distance gradually from one side to the other side in the above-described predetermined direction.

In addition, according to the present embodiment, the plurality of fins 18 each define notch 24 at an end portion opposite to the curved line, the notch having a wedge shape.

According to this configuration, the sound waves emitted from loudspeaker 4 are expanded in the horizontal direction by acoustic lens 6, as described above. As a result, it is possible to bend the directional characteristics of loudspeaker 4 toward the vertical direction, and also to expand the directional characteristics of loudspeaker 4 in the horizontal direction.

In addition, according to the present embodiment, sound path 26 to guide sound waves emitted from loudspeaker 4 to an outside of acoustic lens 6 is defined between adjacent ones of the plurality of fins 18. When a sound path distance is a length of a path of the sound waves emitted from loudspeaker 4 in sound path 26, notch 24 of each of the plurality of fins 18 is set to have a size such that a ratio of the sound path distance that is shortest to the sound path distance that is longest is approximately constant.

According to this configuration, it is possible to substantially equalize the expansion of sound waves in the horizontal direction in any sound paths 26.

In addition, according to the present embodiment, speaker system 2 includes: loudspeaker 4 including diaphragm 12; and acoustic lens 6 of any of the above-described examples that is attached to loudspeaker 4. The plurality of fins 18 of acoustic lens 6 are each disposed at an angle to central axis 22 of diaphragm 12.

According to this configuration, the sound waves emitted from loudspeaker 4 are bent toward the vertical direction by acoustic lens 6, and thus it is possible to bend the directional characteristics of loudspeaker 4 toward the vertical direction, in the same manner as above.

5. Working Examples and Comparison Examples

The following Experiments 1 and 2 were conducted to confirm the advantageous effects of the present embodiment, i.e., the advantageous effects of being able to bend the directional characteristics of loudspeaker 4 in the horizontal direction and toward the vertical direction.

5-1. Experiment 1 (Horizontal Characteristics)

Figure 7:
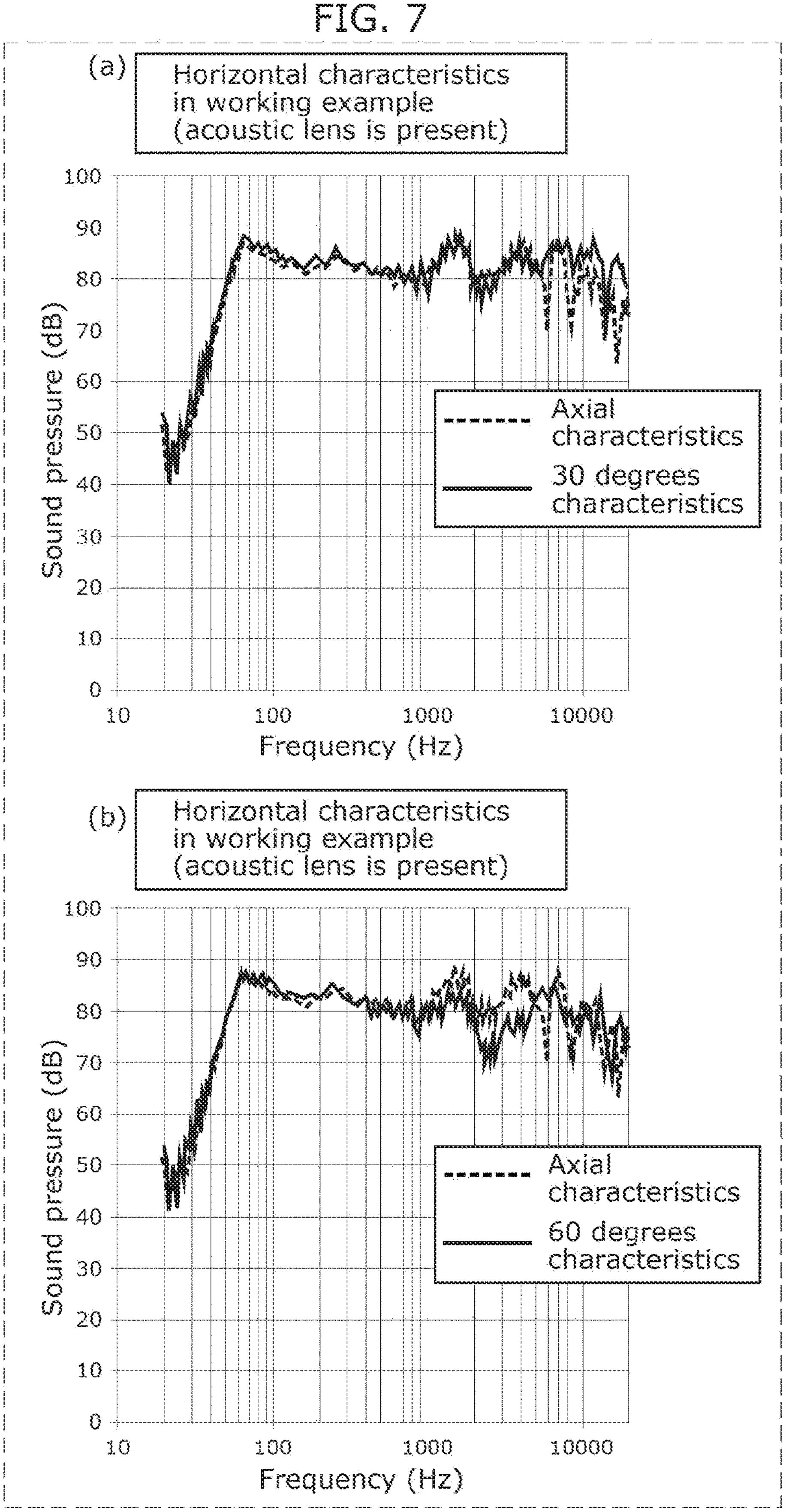
FIG. 7 is a graph illustrating the horizontal characteristics in a working example.
Figure 8:
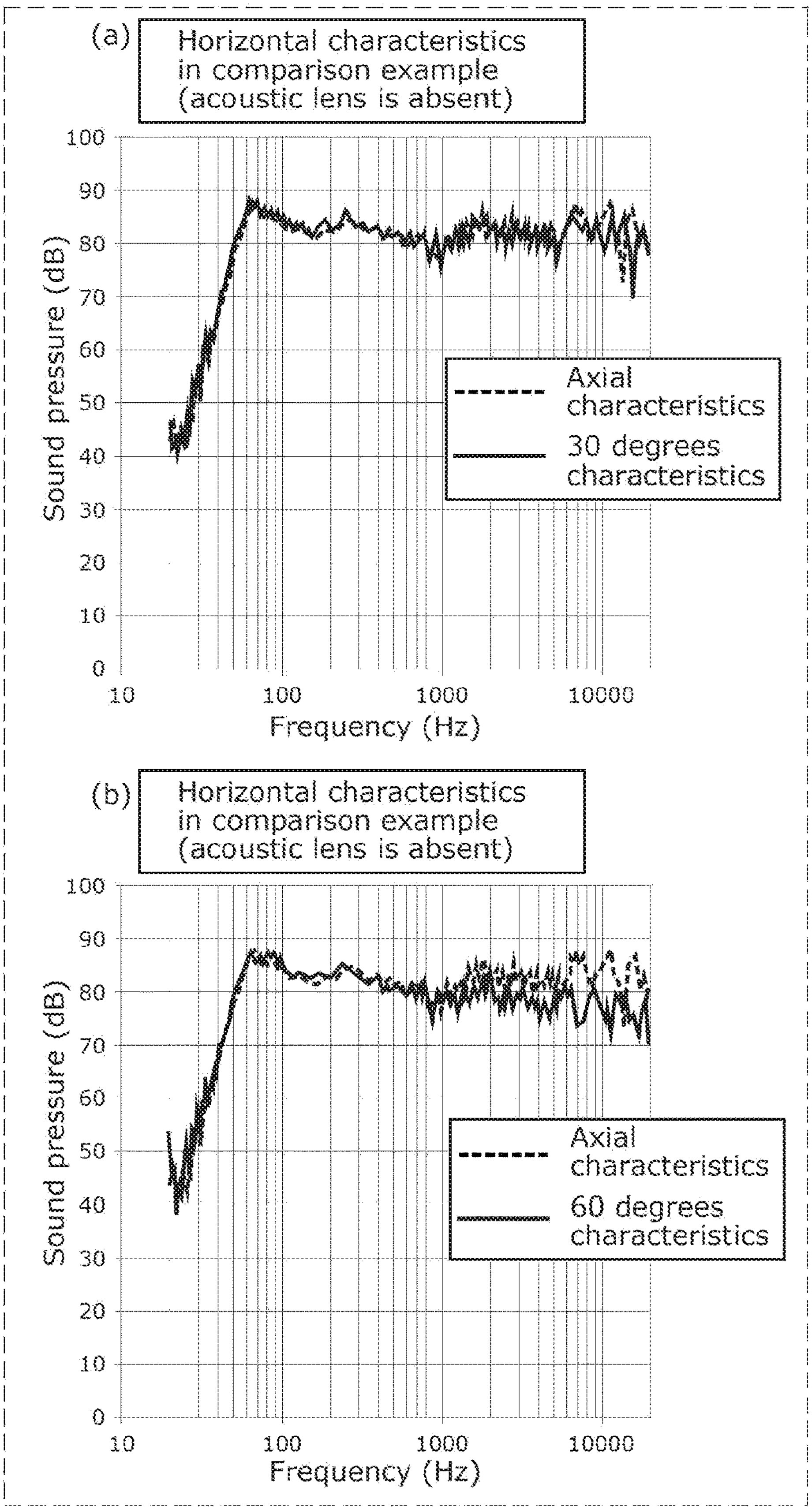
FIG. 8 is a graph illustrating the horizontal characteristics in a comparison example.
Figures 9, 10:
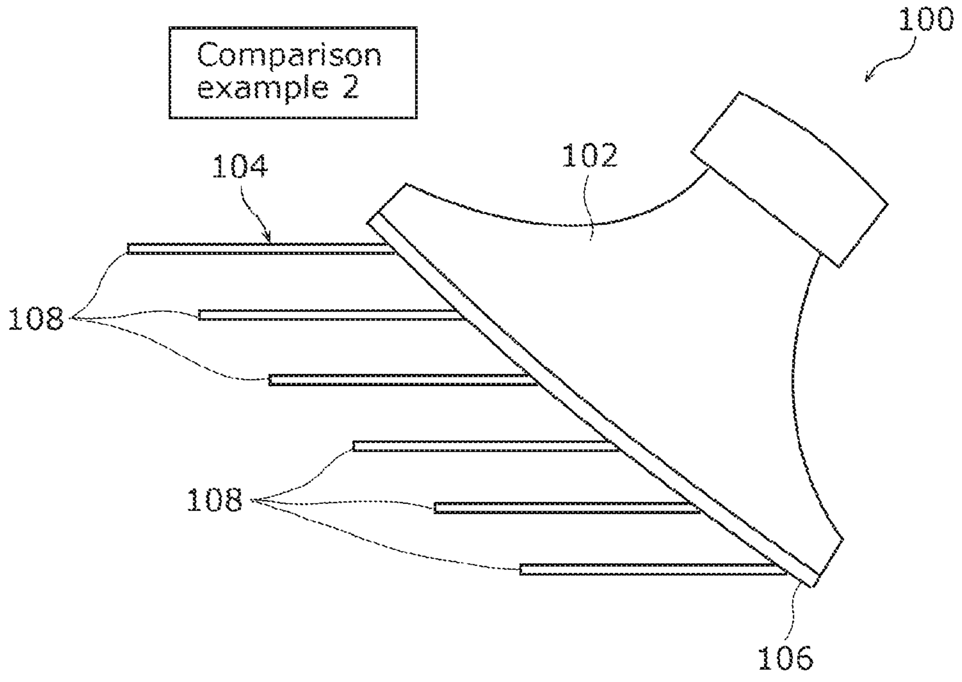
FIG. 9 is a table illustrating comparison results of the horizontal characteristics in the working example and the comparison example.
FIG. 10 is a diagram illustrating a speaker system according to Comparison 2.

First, Experiment 1 will be described with reference to FIG. 7 to FIG. 9. In Experiment 1, the effect of the presence or absence of the acoustic lens on the horizontal characteristics was evaluated. FIG. 7 is a graph illustrating the horizontal characteristics in the working example. FIG. 8 is a graph illustrating the horizontal characteristics in the comparison example. FIG. 9 is a table illustrating the comparison results of the horizontal characteristics in the working example and the comparison example.

As a working example, using speaker system 2 including loudspeaker 4 and acoustic lens 6 illustrated in FIG. 1, evaluation was carried out for: the frequency characteristics of speaker system 2 in a loudspeaker axial direction (frontal direction) which hereinafter will be simply referred to as "axial direction" (hereinafter referred to as "axial characteristics"); the frequency characteristics of speaker system 2 in the direction horizontally inclined by 30 degrees to the axial direction (hereinafter referred to as "30 degrees characteristics"); and the frequency characteristics of speaker system 2 in the direction horizontally inclined by 60 degrees to the axial direction (hereinafter referred to as "60 degrees characteristics"). It should be noted that, in the following description, the "axial direction (loudspeaker axial direction)" means the frontal direction of loudspeaker 4, i.e., the direction of central axis 22 of diaphragm 12 of loudspeaker 4, which is a direction different from the above-described "fin axial direction" indicated by the arrow denoted as A in FIG. 6.

As a comparison example, evaluation was carried out for the axial characteristics, 30 degrees characteristics, and 60 degrees characteristics of loudspeaker 4, using only loudspeaker 4 illustrated in FIG. 2.

The horizontal characteristics (the axial characteristics, the 30 degrees characteristics, and the 60 degrees characteristics) in the working example and the comparison example are as respectively indicated in FIG. 7 and FIG. 8. In (a) and (b) of FIG. 7 and (a) and (b) of FIG. 8, the dashed line graphs indicate the axial characteristics. In addition, in (a) of FIG. 7 and (a) of FIG. 8, the solid line graphs indicate the 30 degrees characteristics, and in (b) of FIG. 7 and (b) of FIG. 8, the solid line graphs indicate the 60 degrees characteristics.

In addition, the comparison results of the horizontal characteristics in the working example and the comparison example are as indicated in FIG. 9. FIG. 9 illustrates the results of subtracting the sound pressure level (dB) of the axial characteristics from the sound pressure level (dB) of the 30 degrees characteristics or 60 degrees characteristics for each frequency in the range of from 2 kHz to 20 kHz, and calculating the average of the resultant values of the subtraction for each frequency. In addition, FIG. 9 illustrates the results of subtracting the sound pressure level (dB) of the axial characteristics from the sound pressure level (dB) of the 30 degrees characteristics or 60 degrees characteristics for each frequency in the range of from 10 kHz to 20 kHz, and calculating the average of the resultant values of the subtraction for each frequency in the same manner as above. FIG. 9 shows that the higher the average value (dB), the higher the sound pressure level of the 30 degrees characteristic or the 60 degrees characteristics, compared to the sound pressure level of the axial characteristics (i.e., the directional characteristics of loudspeaker 4 are expanded in the horizontal direction).

As indicated in FIG. 9, the average values (dB) were higher in the working example than in the comparative example for both the 30 degrees characteristics and the 60 degrees characteristics in the range of from 2 kHz to 20 kHz and the 30 degrees characteristics and the 60 degrees characteristics in the range of from 10 kHz to 20 kHz. As indicated in FIG. 9, it was confirmed that, in the range of from 2 kHz to 20 kHz, the working example has an advantage of 4.0 dB (2.8 dB−(−1.2 dB)) over the comparative example in the 30 degrees characteristics and an advantage of 3.8 dB (−1.7 dB−(−5.5 dB)) over the comparative example in the 60 degrees characteristics. In addition, it was confirmed that, in the range of from 10 kHz to 20 kHz, the working example has an advantage of 8.5 dB (6.3 dB−(−2.2 dB)) over the comparative example in the 30 degrees characteristics and an advantage of 8.1 dB (1.2 dB−(−6.9 dB)) over the comparative example in the 60 degrees characteristics.

From the above, it was confirmed that by attaching acoustic lens 6 according to the embodiment to loudspeaker 4, the advantageous effect of being able to expand the directional characteristics of loudspeaker 4 in the horizontal direction was yielded.

5-2. Experiment 2 (Vertical Characteristics)

Figure 11:
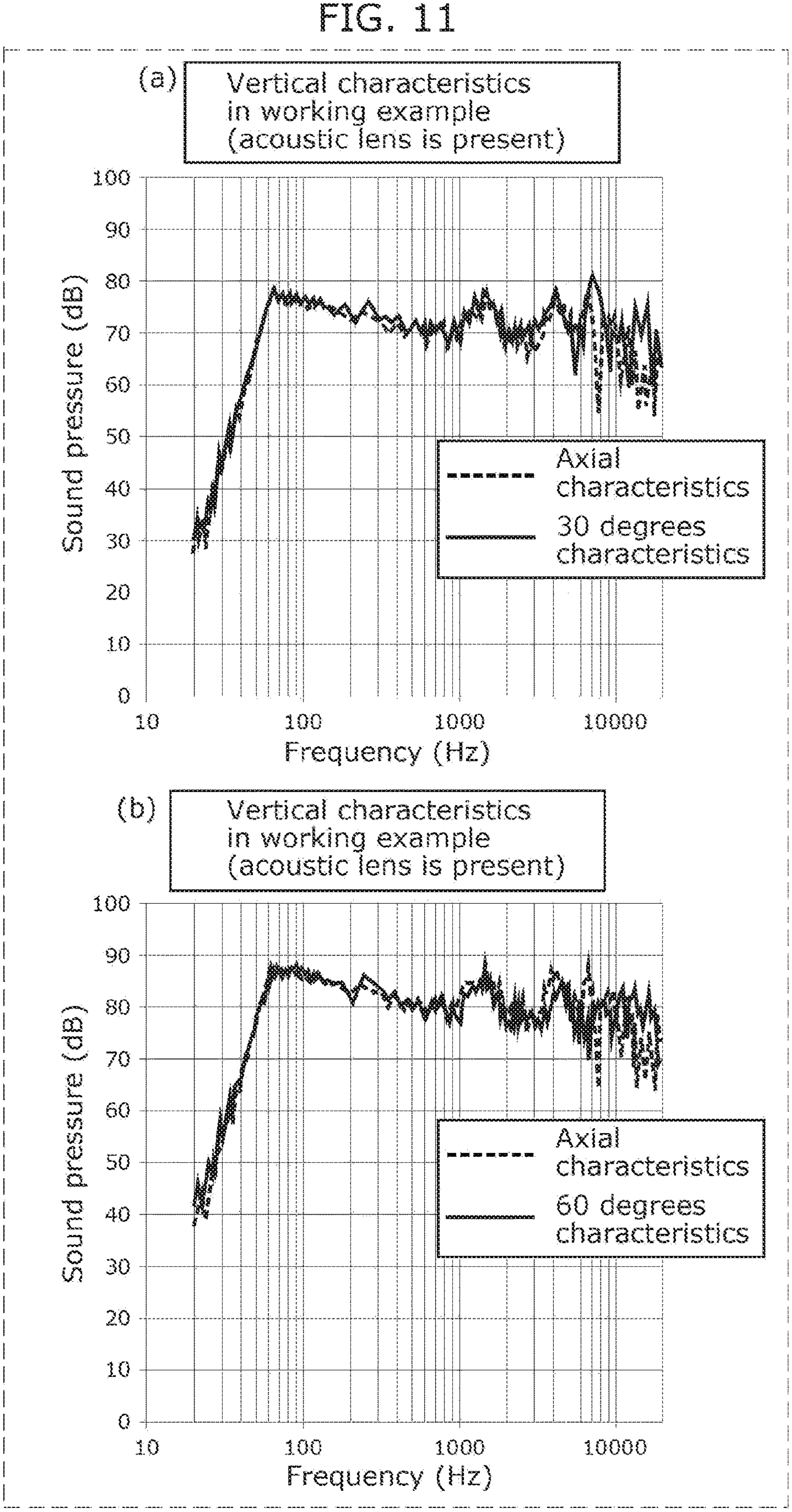
FIG. 11 is a graph illustrating the vertical characteristics in the working example.
Figure 12:
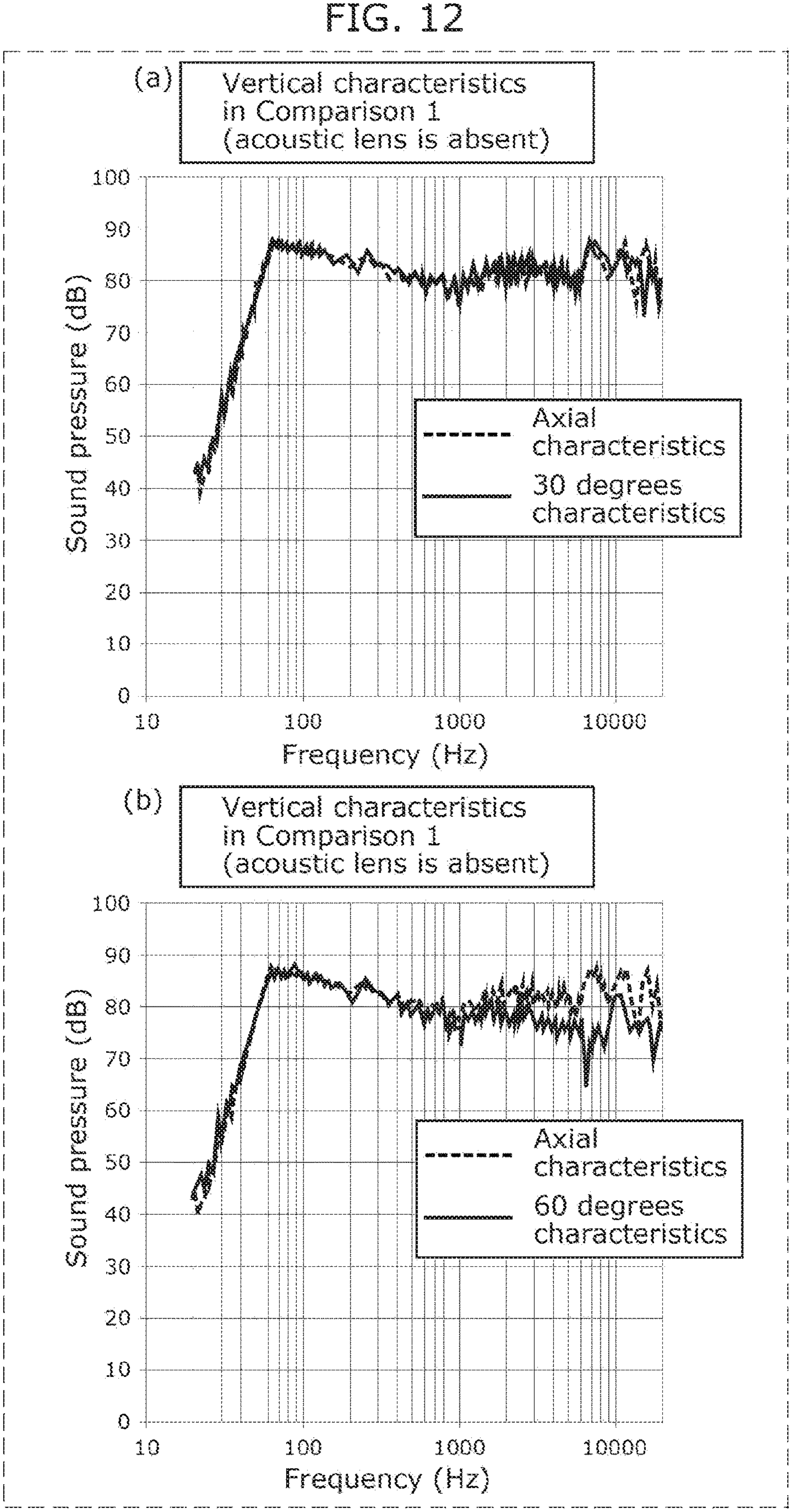
FIG. 12 is a graph illustrating the vertical characteristics in Comparison 1.
Figure 13:
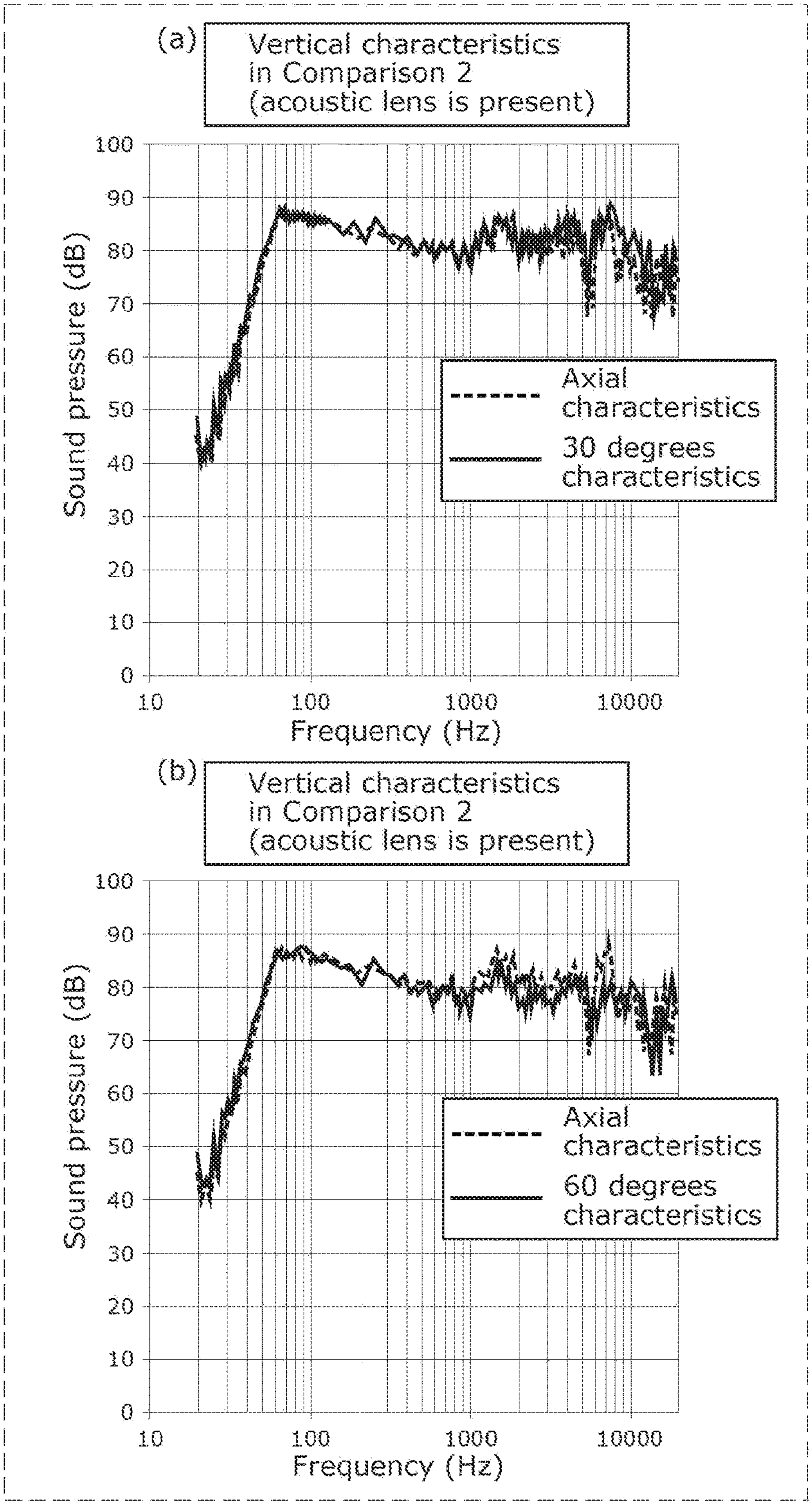
FIG. 13 is a graph illustrating the vertical characteristics in Comparison 2.
Figures 14, 15:
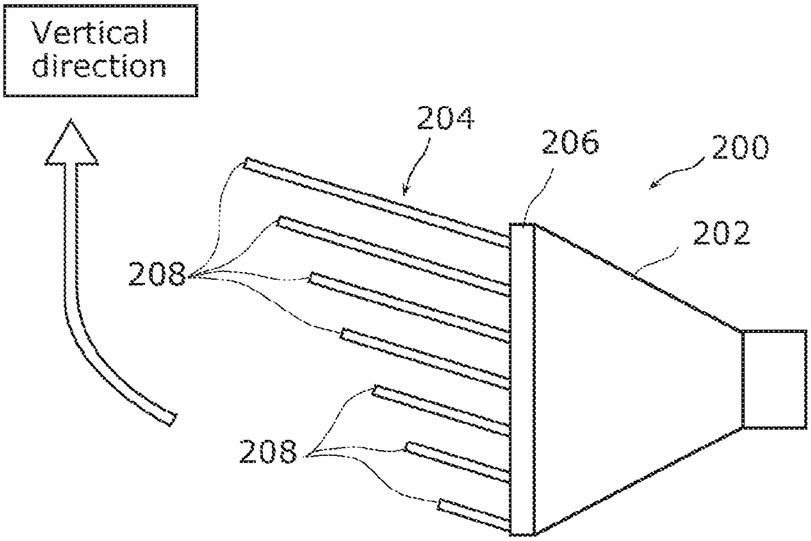
FIG. 14 is a table illustrating the comparison results of the vertical characteristics in the working example, Comparison 1, and Comparison 2.
FIG. 15 is a diagram illustrating a speaker system according to another comparison example.

Next, Experiment 2 will be described with reference to FIG. 10 to FIG. 14. In Experiment 2, the effect of the presence or absence of the acoustic lens on the vertical characteristics was evaluated. FIG. 10 is a diagram illustrating speaker system 100 according to Comparison 2. FIG. 11 is a graph illustrating the vertical characteristics in the working example. FIG. 12 is a graph illustrating the vertical characteristics in Comparison 1. FIG. 13 is a graph illustrating the vertical characteristics in Comparison 2. FIG. 14 is a table illustrating the comparison results of the vertical characteristics in the working example, Comparison 1, and Comparison 2.

As the working example, using speaker system 2 including loudspeaker 4 and acoustic lens 6 illustrated in FIG. 1, evaluation was carried out for: the frequency characteristics of speaker system 2 in the axial direction (hereinafter referred to as "axial characteristics"); the frequency characteristics of speaker system 2 in the direction vertically inclined by 30 degrees to the axial direction (hereinafter referred to as "30 degrees characteristics"); and the frequency characteristics of speaker system 2 in the direction vertically inclined by 60 degrees to the axial direction (hereinafter referred to as "60 degrees characteristics").

As Comparison 1, evaluation was carried out for the axial characteristics, 30 degrees characteristics, and 60 degrees characteristics of loudspeaker 4, using only loudspeaker 4 illustrated in FIG. 2.

As Comparison 2, evaluation was carried out for the axial characteristics, 30 degrees characteristics, and 60 degrees characteristics of speaker system 100, using conventional speaker system 100 including loudspeaker 102 and acoustic lens 104 illustrated in FIG. 10. In speaker system 100 illustrated in FIG. 10, acoustic lens 104 includes linearly extending base 106 and a plurality of fins 108 supported by base 106 and arranged in substantially parallel with each other. The size of each of the plurality of fins 108 was substantially the same. In addition, a notch (not illustrated) having a wedge shape was defined at the center portion of each fin 108 in the width direction.

The vertical characteristics (the axial characteristics, the 30 degrees characteristics, and the 60 degrees characteristics) in the working example, Comparison 1, and Comparison 2 are as respectively indicated in FIG. 11, FIG. 12, and FIG. 13. In (a) and (b) of FIG. 11, (a) and (b) of FIG. 12, and (a) and (b) of FIG. 13, the dashed line graphs indicate the axial characteristics. In addition, in (a) of FIG. 11, (a) of FIG. 12, and (a) of FIG. 13, the solid line graphs indicate the 30 degrees characteristics, and in (b) of FIG. 11, (b) of FIG. 12, and (b) of FIG. 13, the solid line graphs indicate the 60 degrees characteristics.

In addition, the comparison results of the vertical characteristics in the working example, Comparison 1, and Comparison 2 are as indicated in FIG. 14. FIG. 14 illustrates the results of subtracting the sound pressure level (dB) of the axial characteristics from the sound pressure level (dB) of the 30 degrees characteristics or 60 degrees characteristics for each frequency in the range of from 2 kHz to 20 kHz, and calculating the average of the resultant values of the subtraction for each frequency. In addition, FIG. 14 illustrates the results of subtracting the sound pressure level (dB) of the axial characteristics from the sound pressure level (dB) of the 30 degrees characteristics or 60 degrees characteristics for each frequency in the range of from 10 kHz to 20 kHz, and calculating the average of the resultant values of the subtraction for each frequency in the same manner as above. FIG. 14 shows that the higher the average value (dB), the higher the sound pressure level of the 30 degrees characteristic or the 60 degrees characteristics, compared to the sound pressure level of the axial characteristics (i.e., the directional characteristic of loudspeaker 4 is bent toward the vertical direction).

As indicated in FIG. 14, the average values (dB) were higher in the working example than in Comparison 1 for both the 30 degrees characteristics and the 60 degrees characteristics in the range of from 2 kHz to 20 kHz and the 30 degrees characteristics and the 60 degrees characteristics in the range of from 10 kHz to 20 kHz.

In addition, as indicated in FIG. 14, the average values (dB) were higher in the working example than in Comparison 2 for both the 60 degrees characteristics in the range of from 2 kHz to 20 kHz and the 30 degrees characteristics and the 60 degrees characteristics in the range of from 10 kHz to 20 kHz. As illustrated in FIG. 14, it was confirmed that, in the range of from 2 kHz to 20 kHz, the working example has an advantage of 1.3 dB (−0.2 dB−(−1.5 dB)) over Comparison 2 in the 60 degrees characteristics. In addition, it was confirmed that, in the range of from 10 kHz to 20 kHz, the working example has an advantage of 2.6 dB (5.0 dB−(−2.4 dB)) over Comparison 2 in the 30 degrees characteristics and an advantage of 4.8 dB (5.2 dB−(−0.8 dB)) over Comparison 2 in the 60 degrees characteristics.

From the above, it was confirmed that by attaching acoustic lens 6 according to the embodiment to loudspeaker 4, the advantageous effect of being able to bend the directional characteristics of loudspeaker 4 toward the vertical direction was yielded.

6. Comparison with Speaker System According to Another Comparison Example

Figure 16:
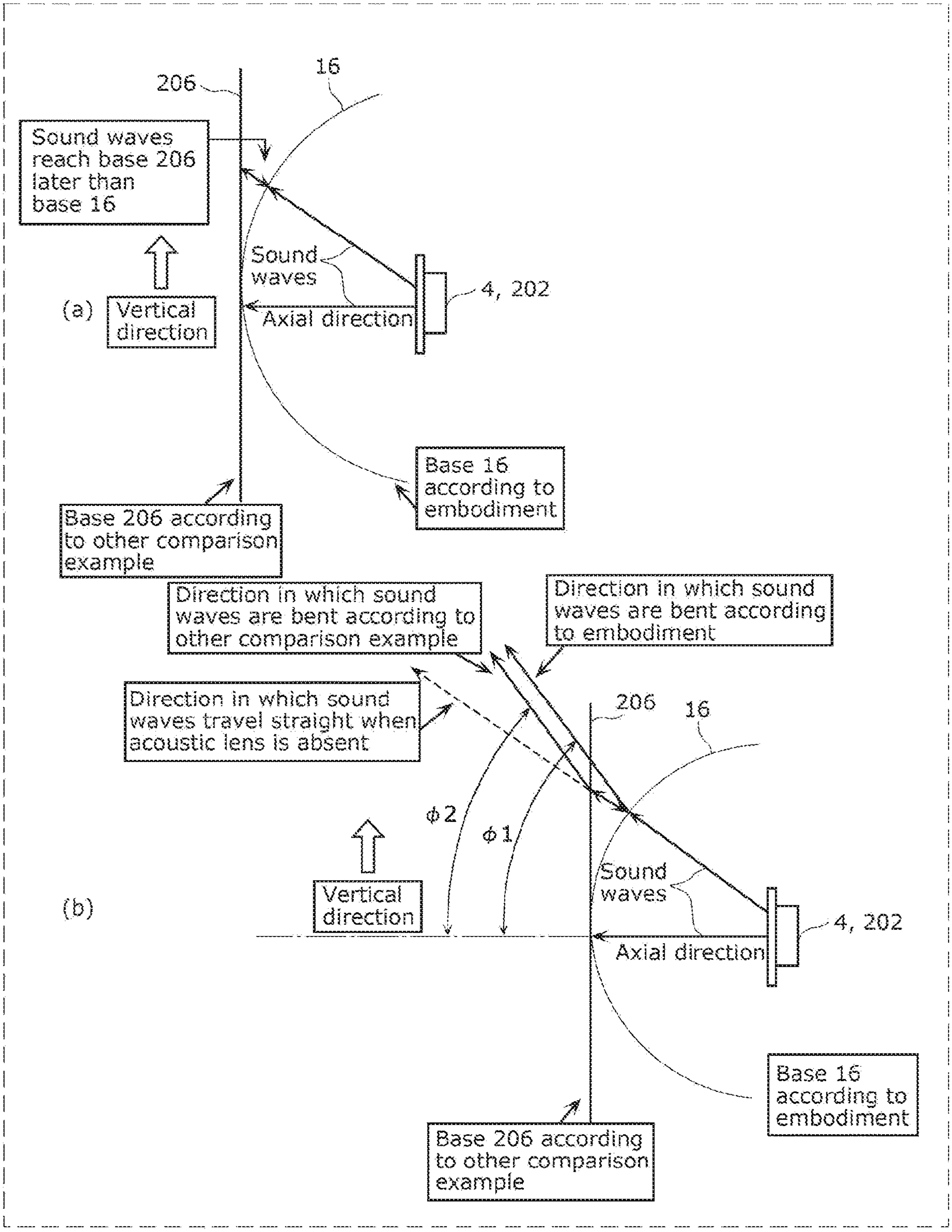
FIG. 16 is a schematic diagram for illustrating the advantageous effects yielded by the speaker system according to the embodiment when compared with the speaker system according to the other comparison example.

With reference to FIG. 15 and FIG. 16, the advantageous effects yielded by speaker system 2 according to the embodiment in comparison with speaker system 200 according to another comparison example will be explained. FIG. 15 is a diagram illustrating speaker system 200 according to another comparison example. FIG. 16 is a schematic diagram for illustrating the advantageous effects yielded by speaker system 2 according to the embodiment when compared with speaker system 200 according to the other comparison example.

As illustrated in FIG. 15, speaker system 200 according to the other comparison example includes loudspeaker 202 and acoustic lens 204 attached to loudspeaker 202. Acoustic lens 204 includes linearly extending base 206 and a plurality of fins 208 supported by base 206 and arranged in substantially parallel with each other.

The plurality of fins 208 are each disposed at a predetermined angle to the central axis of a diaphragm (not illustrated) of loudspeaker 202. The size of each of the plurality of fins 208 gradually increases from one end portion to the other end portion of base 206 in the longitudinal direction (up and down direction in the diagram in FIG. 15). In addition, when acoustic lens 204 is viewed from the lateral side, the line connecting one end portion (the end portion on the side of base 206) in the depth direction (the horizontal direction in the diagram in FIG. 15) of each of the plurality of fins 208 is a straight line, corresponding to the shape of base 206.

In speaker system 200 according to the other comparison example as well, the sound waves emitted from loudspeaker 202 are diffracted by acoustic lens 204 while expanding toward the vertical direction (upward direction in the diagram in FIG. 15), and thus it is possible to bend the directional characteristics of loudspeaker 202 toward the vertical direction. However, for the reasons described below, with speaker system 2 according to the embodiment, it is possible to bend the directional characteristics of loudspeaker 4 toward the vertical direction more effectively than with speaker system 200 according to the other comparison example.

It should be noted that, for convenience of explanation, base 16 is schematically illustrated as a curved line in FIG. 16, in relation to the fact that base 16 according to the embodiment extends along the predetermined direction as convexly curved. In addition, in FIG. 16, base 206 is schematically illustrated as a straight line in relation to the fact that base 206 in the other comparison example is formed in a straight line.

As illustrated in (a) in FIG. 16, as further away from the axial direction, the time for the sound waves from loudspeaker 4 to reach base 16 (the plurality of fins 18) according to the present embodiment becomes shorter than the time for the sound waves from loudspeaker 202 to reach base 206 (the plurality of fins 208) according to the other comparison example. Accordingly, as illustrated in (b) in FIG. 16, angle $\varphi$1 at which the sound waves are bent toward the axial direction by the plurality of fins 18 (see FIG. 1) according to the embodiment is greater than angle $\varphi$2 at which the sound waves are bent toward the axial direction by the plurality of fins 208 (see FIG. 15) according to the other comparison example.

As a result, with speaker system 2 according to the embodiment, it is possible to bend the directional characteristics of loudspeaker 4 at a greater angle toward the vertical direction than with speaker system 200 according to the other comparison example, due to the fact that base 16 of speaker system 2 extends as convexly curved along a predetermined direction on a side opposite to loudspeaker 4.

Other Embodiments

As described above, the embodiment has been described as an example of the technique disclosed by the present application.

However, the technique according to the present disclosure is not limited to the foregoing embodiments, and can also be applied to embodiments to which a change, substitution, addition, or omission is executed as necessary. In addition, each of the components described in the foregoing embodiments may be combined into a new embodiment.

The following exemplifies another embodiment.

In the above-described embodiments, notch 24 is defined in each fin 18. However, the present disclosure is not limited to this, and notch 24 may be omitted. In this case as well, it is possible to bend the directional characteristics of loudspeaker 4 toward the vertical direction.

As described above, the embodiments are described as exemplifications of the technique according to the present disclosure. The attached Drawings and the detailed descriptions are provided for that purpose.

Accordingly, the structural components described in the attached Drawings and the detailed descriptions may include not only the structural components which are essential for solving the problems but also the structural components which are not essential for solving the problems but used for exemplifying the above-described techniques. As such, description of these non-essential structural components in the accompanying drawings and the detailed description should not be taken to mean that these non-essential structural components are essential.

Furthermore, since the foregoing embodiments are for exemplifying the technique according to the present disclosure, various changes, substitutions, additions, omissions, and so on, can be carried out within the scope of the Claims or its equivalents.

INDUSTRIAL APPLICABILITY

The present disclosure is applicable to acoustic lenses that are attached to loudspeakers such as tweeters, etc.

The invention claimed is:

1. An acoustic lens that is attached to a loudspeaker, the acoustic lens comprising:

a plurality of fins each having one end portion located on a curved line that extends as convexly curved along a predetermined direction on a side opposite to the loudspeaker when the acoustic lens is viewed from a lateral side, the plurality of fins being arranged in the predetermined direction at substantially equal intervals and substantially in parallel to one another, wherein when the acoustic lens is viewed from the lateral side, the plurality of fins are substantially identical in length, and an elevation angle of the curved line relative to each of the plurality of fins gradually increases from one side to an other side in the predetermined direction.

2. The acoustic lens according to claim 1, further comprising:

a base including a support surface that defines the curved line when the acoustic lens is viewed from the lateral side, wherein the one end portion of each of the plurality of fins is supported by the support surface of the base.

3. The acoustic lens according to claim 2, wherein the plurality of fins include n fins from a first fin to an n-th fin, n being an integer greater than or equal to 2, and when the acoustic lens is viewed from the lateral side, a relationship of $\theta 1 < \ldots < \theta n$ is established, $\theta$1 denoting an elevation angle of the support surface relative to the first fin, $\theta n$ denoting an elevation angle of the support surface relative to the n-th fin.

4. The acoustic lens according to claim 3, wherein the elevation angle denoted as $\theta$1 is greater than 0 degrees and less than or equal to 30 degrees.

5. The acoustic lens according to claim 1, wherein the plurality of fins are substantially identical in size.

6. The acoustic lens according to claim 1, wherein the plurality of fins each define a notch at an other end portion opposite to the curved line, the notch having a wedge shape.

7. The acoustic lens according to claim 6, wherein a sound path to guide sound waves emitted from the loudspeaker to an outside of the acoustic lens is defined between adjacent ones of the plurality of fins, and when a sound path distance is a length of a path of the sound waves emitted from the loudspeaker in the sound path, the notch of each of the plurality of fins is set to have a size such that a ratio of the sound path distance that is shortest to the sound path distance that is longest is approximately constant.

8. A speaker system, comprising:

the loudspeaker including a diaphragm; and the acoustic lens according to claim 1, the acoustic lens being attached to the loudspeaker, wherein the plurality of fins of the acoustic lens are each disposed at an angle to a central axis of the diaphragm.

9. An acoustic lens that is attached to a loudspeaker, the acoustic lens comprising:

a plurality of fins each having one end portion located on a curved line that extends as convexly curved along a predetermined direction on a side opposite to the loudspeaker when the acoustic lens is viewed from a lateral side, the plurality of fins being arranged in the predetermined direction; and a base including a support surface that defines the curved line when the acoustic lens is viewed from the lateral side, wherein:

when the acoustic lens is viewed from the lateral side, an elevation angle of the curved line relative to each of the plurality of fins gradually increases from one side to an other side in the predetermined direction, and the one end portion of each of the plurality of fins is supported by the support surface of the base.

10. The acoustic lens according to claim 9, wherein the plurality of fins include n fins from a first fin to an n-th fin, n being an integer greater than or equal to 2, and when the acoustic lens is viewed from the lateral side, a relationship of $\theta 1 < \ldots < \theta n$ is established, $\theta 1$ denoting an elevation angle of the support surface relative to the first fin, $\theta n$ denoting an elevation angle of the support surface relative to the n-th fin.

11. The acoustic lens according to claim 10, wherein the elevation angle denoted as $\theta 1$ is greater than 0 degrees and less than or equal to 30 degrees.

12. A speaker system, comprising:

the loudspeaker including a diaphragm; and the acoustic lens according to claim 9, the acoustic lens being attached to the loudspeaker, wherein the plurality of fins of the acoustic lens are each disposed at an angle to a central axis of the diaphragm.

13. An acoustic lens that is attached to a loudspeaker, the acoustic lens comprising:

a plurality of fins each having one end portion located on a curved line that extends as convexly curved along a predetermined direction on a side opposite to the loudspeaker when the acoustic lens is viewed from a lateral side, the plurality of fins being arranged in the predetermined direction, wherein:

when the acoustic lens is viewed from the lateral side, an elevation angle of the curved line relative to each of the plurality of fins gradually increases from one side to an other side in the predetermined direction, and the plurality of fins each define a notch at an other end portion opposite to the curved line, the notch having a wedge shape.

14. The acoustic lens according to claim 13, wherein a sound path to guide sound waves emitted from the loudspeaker to an outside of the acoustic lens is defined between adjacent ones of the plurality of fins, and when a sound path distance is a length of a path of the sound waves emitted from the loudspeaker in the sound path, the notch of each of the plurality of fins is set to have a size such that a ratio of the sound path distance that is shortest to the sound path distance that is longest is approximately constant.

15. A speaker system, comprising:

the loudspeaker including a diaphragm; and the acoustic lens according to claim 13, the acoustic lens being attached to the loudspeaker, wherein the plurality of fins of the acoustic lens are each disposed at an angle to a central axis of the diaphragm.

* * * * *